Figure 1:
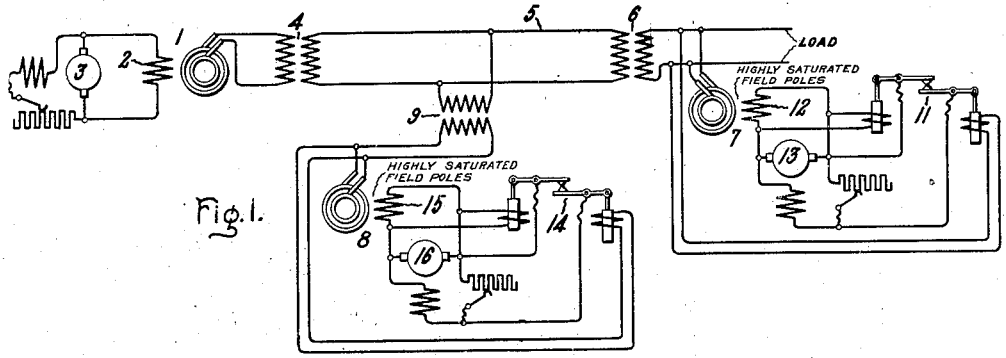

Sept. 6, 1927.                                                    1,641,737
                          E. CLARKE
                  ELECTRICAL POWER TRANSMISSION
                     Filed April 30, 1925

Inventor
                                       Edith Clarke,
                                   by
                                         Her Attorney Patented Sept. 6, 1927.

1,641,737

UNITED STATES PATENT OFFICE.

EDITH CLARKE, OF SCHENECTADY, NEW YORK, ASSIGNOR TO GENERAL ELECTRIC COMPANY, A CORPORATION OF NEW YORK.

ELECTRICAL POWER TRANSMISSION.

Application filed April 30, 1925. Serial No. 27,047.

My invention relates to electrical power transmission lines and systems and more particularly to the transmission of electrical power at high voltage over long distance.

With the great increase in the size and length of transmission systems in recent years, the maximum power which can be transmitted is governed to a material extent by the voltage variation in the line. This is evident when one considers the high reactance of a long line which introduces a considerable drop in voltage under load and a considerable rise in voltage at the receiving end under no load due to charging current flowing through the line. In general, with any length of line in which the amperes of charging current approach in magnitude the value of the load current. the matter of power factor becomes important, not merely as one of the underlying features in drop calculations but serving as the only feasible means of controlling voltage and efficiency.

Synchronous phase modifiers, such as synchronous condensers, have been used heretofore for correcting the power factor and for regulating and stabilizing the voltage of transmission lines. For example, when the line is carrying a large load with a low power factor the condenser is overexcited enough to produce a leading current large enough to counteract in part the inductive reactive component of the line drop. When the line is carrying a small load, the synchronous condenser is underexcited so that it draws a lagging current sufficient to maintain a line drop between the generator and receiving circuit equal to the full load line drop.

The change in excitation necessary to vary the reactive power added to the system by a synchronous phase modifier is usually accomplished by means of a vibratory type of regulator periodically short circuiting a series resistance in the field of the exciter for the phase modifier, the regulator being responsive to line voltage. This change in excitation, however, occurs at an appreciable interval of time after the application of load and consequent line voltage change. When the line is operating near the maximum power limit any decrease in line voltage permitted must be kept small, otherwise the line becomes unstable upon a suddenly increased power demand. Therefore, it becomes important to hold up the line voltage and prohibit a decrease in voltage to a point of instability during whatever interval may be required for the regulator to function to restore the voltage to normal value.

When using synchronous phase modifiers having the characteristics of those hitherto used, the margin between the operating load and the maximum power limit must be substantial because of the deficiency in inherent regulating capacity of such phase modifying devices to hold up the line voltage until the regulator functions for sudden changes in load. With long lines it becomes desirable to decrease this margin in order to transmit sufficient power for an economic development and it becomes important to have a line that is stable near its maximum power limit.

As will be set forth more in detail hereinafter, I have devised an electrical power transmission system in which the limitations for power transfer due to voltage variations in the line have been minimized by suitable design, location, and novel inherent operation of the apparatus comprising the system.

An embodiment of my invention comprises an electrical power transmission system having a source of alternating-current energy supply of synchronous generators, supplying a distant receiving station which may consist of synchronous motors, induction motors, lighting loads, and in general any customary industrial load. The system also comprises highly saturated synchronous phase modifying devices such as synchronous condensers, connected for example at the receiving station and at suitable points along the transmission line connecting the two stations. The synchronous condensers are provided with suitable regulating means, which may, for example, operate similarly to those previously used.

In an electrical power transmission system the line voltage will tend to fall with increased load and in lines operating near the maximum power limit a point of instability is soon reached. Hitherto lines have been operated so that a considerable momentary decrease in line voltage was permissible because the margin maintained between the operating load and the maximum power limit was such that the regulators operated so that the change in condenser excitation and consequent inter-change of reactive power to the system was sufficient to bring the voltage back to a predetermined value before a point of instability was reached. In the present system the synchronous condensers are so designed and operated that upon a sudden application of load an interchange of corrective reactive power of sufficient magnitude is inherently obtained to prevent the line voltage from dropping to an unstable value. The time required for the voltage to fall to any given value for a given increase in load is increased by the inherent action of the condenser since the greater the fall in voltage is, the greater is the reactive power correction. The regulator, when it functions, increases the excitation so as to bring the line voltage back to normal and maintain it at such value.

My invention will be better understood from the following description taken in connection with the accompanying drawing and its scope will be pointed out in the appended claims.

Figure 2:
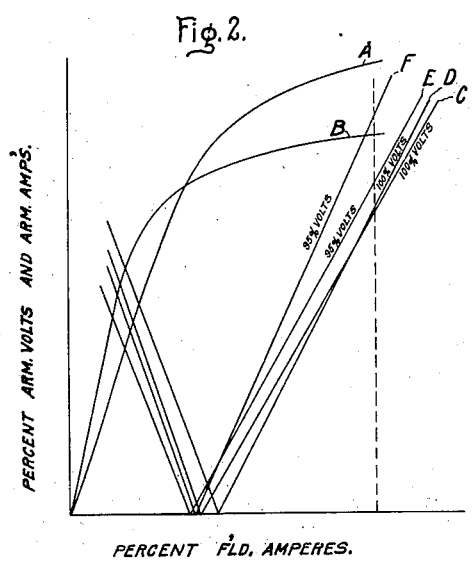
Figure 3:
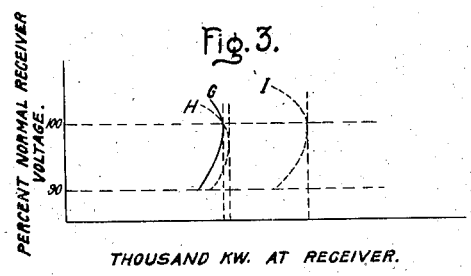

In the drawing Fig. 1 is a diagrammatic illustration of an electrical power transmission system embodying my invention; Fig. 2 is a diagram of saturation curves and phase characteristic curves of a normally designed synchronous condenser and comparative curves for a synchronous condenser employed in the transmission system embodying my invention; Fig. 3, is a diagram of power-stability curves illustrating in a general way the improvement in power transmission obtained by my invention.

Referring to Fig. 1 of the drawing, 1 denotes an alternating current generator with an exciter 3 exciting the field winding 2 of the generator. The apparatus at the generating end provides the energy to be transmitted over step-up transformer 4, the transmission line 5 and the step-down transformer 6 to the receiving station. The receiving station feeds any general industrial load and includes a synchronous phase advancer 7, such as a synchronous motor or condenser with highly saturated field poles. At the mid-point of the line, or any other intermediate point or points between the generator and receiving end, a similar synchronous regulating means such as a synchronous condenser 8 with highly saturated field poles is connected to the line by means of a suitable transformer 9.

A Tirrill-type or vibratory regulator 11, or any similarly sensitive type of regulator serves to influence the voltage of exciter 13, which in turn energizes the field winding 12 of synchronous condenser 7. In like manner regulator 14, similar to regulator 11, influences the voltage of exciter 16, which in turn energizes the field winding 15 of synchronous condenser 8. The regulators are provided for automatically regulating the under-excitation or over-excitation of each synchronous machine as the line voltage changes.

Fig. 2 shows saturation curves for two synchronous condensers as plotted between per cent field amperes and per cent armature volts. Curve A is for an ordinary synchronous condenser and curve B for a synchronous condenser as used in carrying out my invention. The phase characteristics are represented by curves C, D, E and F, plotted between per cent field amperes and per cent armature amperes. It will be noted that for a given change in line voltage at constant field current there will be available a greater change of armature current when using the saturated machine. For example, if the curves C and D, and E and F, represent phase characteristics at 100% and 95% normal line voltage respectively, a drop in line voltage of 5% for an ordinary machine as indicated by curves C and E makes available an increase of about 8% armature amperes at an excitation corresponding to 100% of that required for full load kilovolt-amperes zero power factor leading. However, with a highly saturated machine as represented by curves D and F a change in line voltage of 5% will make available an increase of about 30% armature amperes at the same excitation. It therefore follows that the machine with the flatter saturation curve will be capable of supplying a greater amount of reactive kilovolt-amperes for a given change in line voltage.

Stability or power-limit curves are shown in Fig. 3. These curves consist of plots of voltage against power for synchronous terminal apparatus interconnected by a transmission line with field excitation as a parameter. The point of vertical tangency on each curve marks the maximum power which can be transmitted between the two machines at a given field excitation. A series of such curves will give, at their points of vertical tangency, the power limit for the particular values of excitation for which they are drawn, and if the locus of these power limit points is drawn, its intersection with any particular constant voltage line will give the maximum power transferable over the line at that particular voltage. Curve G represents the power-limit curve of a single circuit three phase line, 250 miles long with a supply voltage of 220,000 volts, supplying a load of unity power factor.

The point of vertical tangency to the curve G marks the maximum power which can be transmitted over the assumed line with generating and phase modifying apparatus of usual design at a given excitation. If an increased load demand occurs suddenly, before the regulator can increase the field of the phase modifying device, the voltage will fall; the system will then be operating on the underside of the curve or in a region of instability.

By using highly saturated phase modifying devices connected to the system the nose of the curve G is extended and takes the new position as represented by the dotted curve H. The same load, assumed as the maximum in the first instance, may now be carried, since a small drop in voltage is permissible before the point of vertical tangency is reached. Greater loads may be carried with gradually decreasing margins between the operating load and the maximum power limit until the condition of operation is reached as indicated by dotted curve I, which indicates a condition originally encountered with curve G but with a decided increase in the maximum power limit.

The operation of the present system consists generally in shifting the phase position of the line current to be more nearly in phase with the voltage in order to improve the power factor of the line and also to maintain a certain desired voltage at the receiving end or along the line. The synchronous condensers 7 and 8 are provided to vary the phase angle at the receiving circuit or along the line by causing the condensers to draw lagging or leading currents and thereby add reactive power to the system.

The addition of reactive power in the present system occurs in two steps. First, by the inherent regulating action of the synchronous condensers and, second, by the change in field excitation effected by regulators 11 and 14 influencing the voltage of the condenser field exciters 13 and 16 respectively.

By inherent regulating action is meant the automatic tendency of a synchronous condenser to draw lagging or leading current depending on the relative values of impressed voltage and the induced or counter voltage of the condenser. If the impressed voltage drops below the value of the counter-voltage, the condenser will draw a leading current. If the impressed voltage rises above the countervoltage the motor will draw a lagging current.

Assume, in the system illustrated, there is a sudden increased load demand. The line voltage will begin to fall and the condensers 7 and 8 will have a higher countervoltage and consequently draw a leading current the magnitude of which will depend, among other things, on the fall in line voltage. The magnitude of this current, as has been pointed out, will be sufficient to prevent a decrease in line voltage to the point of instability. This maintenance of the line voltage is supplemented by the regulator 11 which increases the current in field winding 12 of condenser 7. In like manner the regulator 14 provides for an increase of current in the field 15 of condenser 8.

In the present system the inherent regulating action of the synchronous condensers enters into the operation of the system as a material factor because the reactive power added to the system for a slight change in line voltage is of sufficient magnitude to prevent an abrupt change in line voltage and when the regulator functions the voltage is brought back to a predetermined value. Therefore, the present system permits operation closer to the maximum power limit of a given line and provides for a power transfer greatly in excess of systems depending solely on voltage regulator control.

What I claim as new and desire to secure by Letters Patent of the United States, is:

1. In a high-voltage electrical power transmission system, the combination of a source of alternating-current supply, a receiving circuit, a transmission line connecting said source of supply and said receiving circuit, means comprising a synchronous phase modifier with a highly saturated field structure connected to said transmission line, a regulator for automatically regulating the field excitation of said phase modifier in accordance with voltage variations in the line, said phase modifier being so saturated that upon sudden application of load and consequent decrease in line voltage corrective reactive power of sufficient magnitude is added to the system to prevent a material drop in voltage, whereby the system may be operated closer to its maximum power limit.

2. In a high-voltage electrical power transmission system, the combination of a source of alternating-current supply, a receiving circuit, a transmission line connecting said source of supply and said receiving circuit, a synchronous condenser with highly saturated field poles connected to the line at a point intermediate the supply and receiving circuit, a second synchronous condenser with highly saturated field poles connected to the line at a point adjacent the receiving circuit, a regulator for each synchronous condenser automatically regulating the field excitation thereof in accordance with the variations in line voltage at the respective points of connection, said synchronous condensers being so saturated that upon sudden increase in power demand corrective reactive power of sufficient magnitude is added to the system to prevent the line voltage from dropping to a value where the line is unstable, whereby the system may be operated closer to its maximum power limit.

3. In a high-voltage electrical power transmission system, the combination of a source of alternating-current energy supply, a receiving circuit, a transmission line connecting said source of supply and said receiving circuit, a synchronous condenser with highly saturated field poles connected in parallel with said receiving circuit, a regulator for automatically regulating the field excitation of said synchronous condenser in accordance with variations in receiver voltage, said synchronous condenser being so saturated that upon sudden application of load corrective reactive power of sufficient magnitude is added to the system, during the interval required for the regulator to function to restore the line voltage, to maintain the voltage above a value at which the line is unstable.

4. In a high-voltage electrical power transmission system, the combination of a source of alternating-current supply, a receiving circuit, a transmission line connecting said source of supply and said receiving circuit, a synchronous condenser with highly saturated field poles connected to the line at a point intermediate the supply and receiving circuit, a regulator for automatically regulating the field excitation of said synchronous condenser in accordance with variations in line voltage at the point of connection, said synchronous condenser being so saturated that upon a change of load tending to produce a drop in line voltage corrective reactive power of sufficient magnitude is added to the system, during the interval required for the regulator to function to restore the line voltage, to prevent the line voltage from falling to a value where the line is unstable.

In witness whereof, I have hereunto set my hand this 28th day of April, 1925.

EDITH CLARKE.